United States Patent
Chiang et al.

(10) Patent No.: US 6,724,614 B1
(45) Date of Patent: Apr. 20, 2004

(54) INFORMATION APPARATUS SUPPORT STRUCTURE

(75) Inventors: Chia Kuang Chiang, Taipei (TW); Hsin Chang Chen, Taipei (TW)

(73) Assignee: First International Computer Inc., Taipei (TW)

( * ) Notice: Subject to any disclaimer, the term of this patent is extended or adjusted under 35 U.S.C. 154(b) by 0 days.

(21) Appl. No.: 10/351,378

(22) Filed: Jan. 27, 2003

(51) Int. Cl.[7] .................................................. G06F 1/16

(52) U.S. Cl. ..................... 361/681; 361/686; 364/708.1

(58) Field of Search ................................ 361/679–687, 361/704–707, 752–753; 364/708.1, 223.1, 223.2; 395/325; 439/152–160; 16/389, 392

(56) References Cited

U.S. PATENT DOCUMENTS

| | | | | |
|---|---|---|---|---|
| 6,297,949 B1 | * | 10/2001 | Nayak et al. | 361/684 |
| 6,307,745 B1 | * | 10/2001 | Liebenow | 361/686 |
| 6,512,671 B1 | * | 1/2003 | Okano et al. | 361/686 |

* cited by examiner

*Primary Examiner*—Hung Van Duong
(74) *Attorney, Agent, or Firm*—Browdy and Neimark, P.L.L.C.

(57) ABSTRACT

An information apparatus support structure is constructed to include a base carrying an input device, a first support frame pivoted with one side to the base, a foldaway stand provided at the inner side of the first support, and a second support frame pivoted to one side of the first support frame remote from the base and adapted to support the first support frame in a tilted position. The base has two pivoted clamping plates adapted to hold down the first support frame and the second support frame on the base in a stack.

5 Claims, 5 Drawing Sheets

INFORMATION APPARATUS SUPPORT STRUCTURE

BACKGROUND OF THE INVENTION

1. Field of the Invention

The present invention relates to an information apparatus support structure and, more particularly, to such an information apparatus support structure, which carries an input device and, has means to support an information apparatus in a tilted position above the front side of the input device.

2. Description of the Related Art

Following fast development of information industry, a variety of advanced computers and personal electronic apparatus such as PC (personal computer), NB (notebook computer), Tablet PC (tablet personal computer), PDA (personal digital assistant), etc., have been developed, and have appeared on the market. When using a tablet PC 9, the user may have to hold the table PC 9 with one hand 8, and to click the pointer on the display screen of the tablet PC 9 with the other hand. If the user puts the table PC 9 on a flat surface, the sharp view angle tires the user's eyes quickly.

SUMMARY OF THE INVENTION

The present invention has been accomplished under the circumstances in view. It is therefore the main object of the present invention to provide an information apparatus support structure, which is practical for supporting an information apparatus in a tiled angle for operation. It is another object of the present invention to provide an information apparatus support structure, which is conveniently adjustable to support an information apparatus subject to the desired view angle. It is still another object of the present invention to provide an information apparatus support structure, which has input means for data input into the information apparatus supported thereon. To achieve these and other objects of the present invention, the information apparatus support structure comprises a base, the base comprising an input device, and two clamping plates respectively pivoted to two opposite lateral sides thereof; a first support frame pivoted to the base and turnable relative to the base between a received position closely attached to the base and a tilted position above the base, the first support frame comprising a recessed receiving space in an inner side thereof facing the base and a foldaway stand pivoted to the inner side and turned in and out of the recessed receiving space and adapted to supporting an information apparatus on the first support frame and the first support frame turned outward from the base to the tilted position; and a second support frame pivoted to one side of the first support frame remote from the base and turnable relative to the first support member between an operative position where the second support frame support the first support frame in the tilted position and a non-operative position where the second support frame is closely attached to an outer side of the first support frame for enabling the first support frame and the second support frame to be held down on the base by the clamping plates when the first support frame turned to the received position.

DETAILED DESCRIPTION OF THE PREFERRED EMBODIMENT

Figure 1:
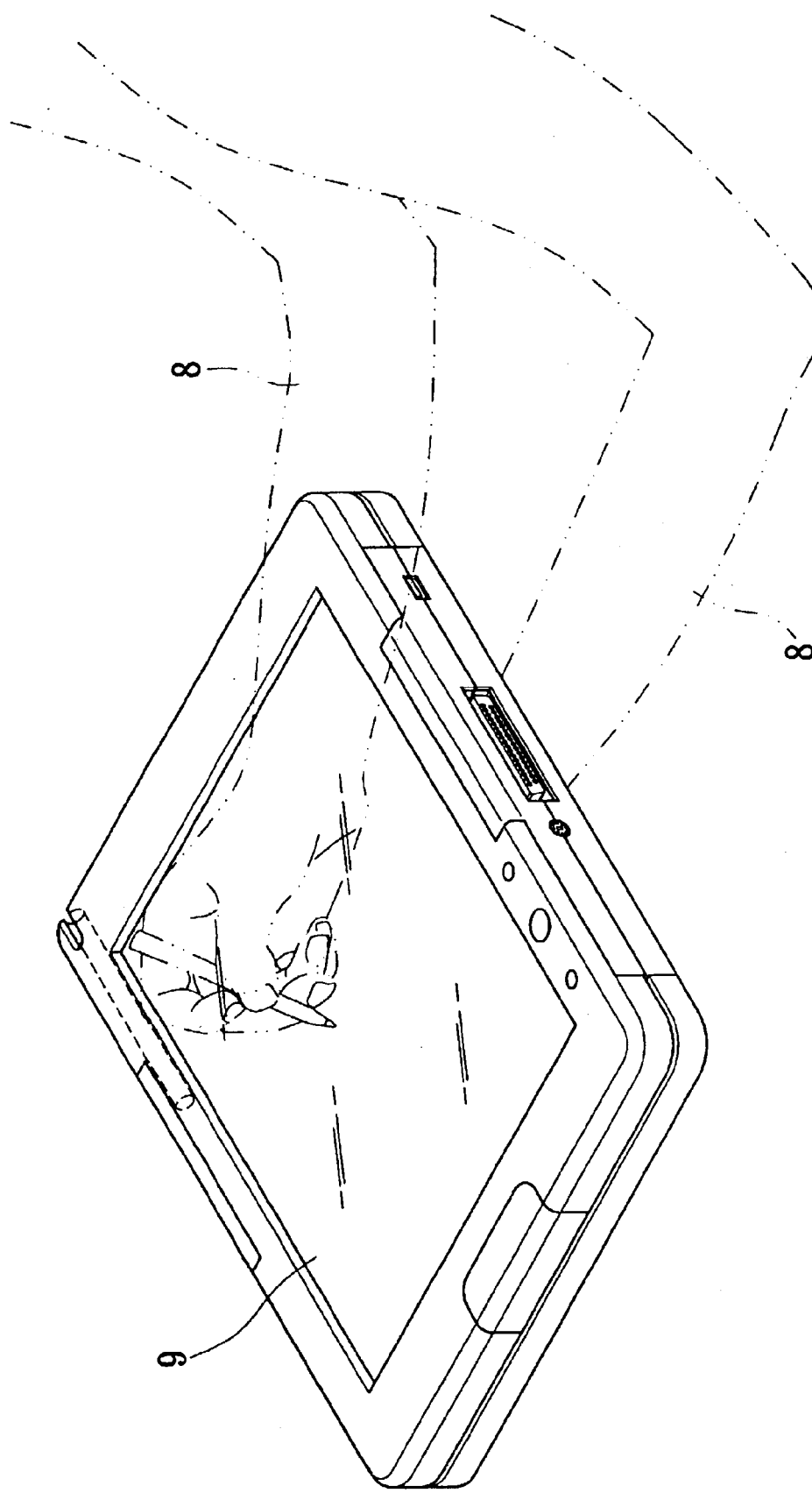
FIG. 1 is a schematic drawing showing a status of the use of a conventional tablet PC.
Figure 2:
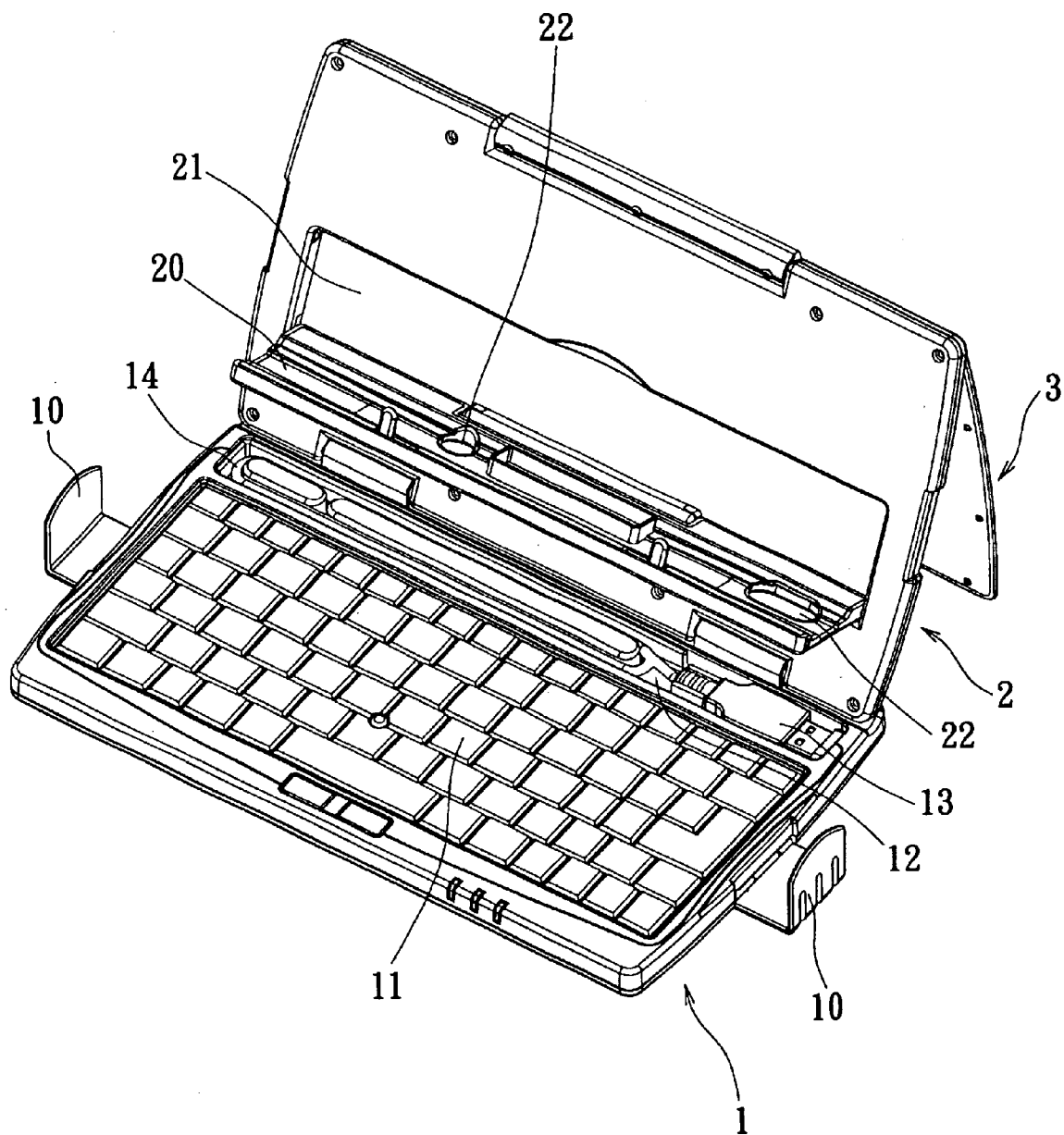
FIG. 2 is a perspective view of the preferred embodiment of the present invention.
Figure 3:
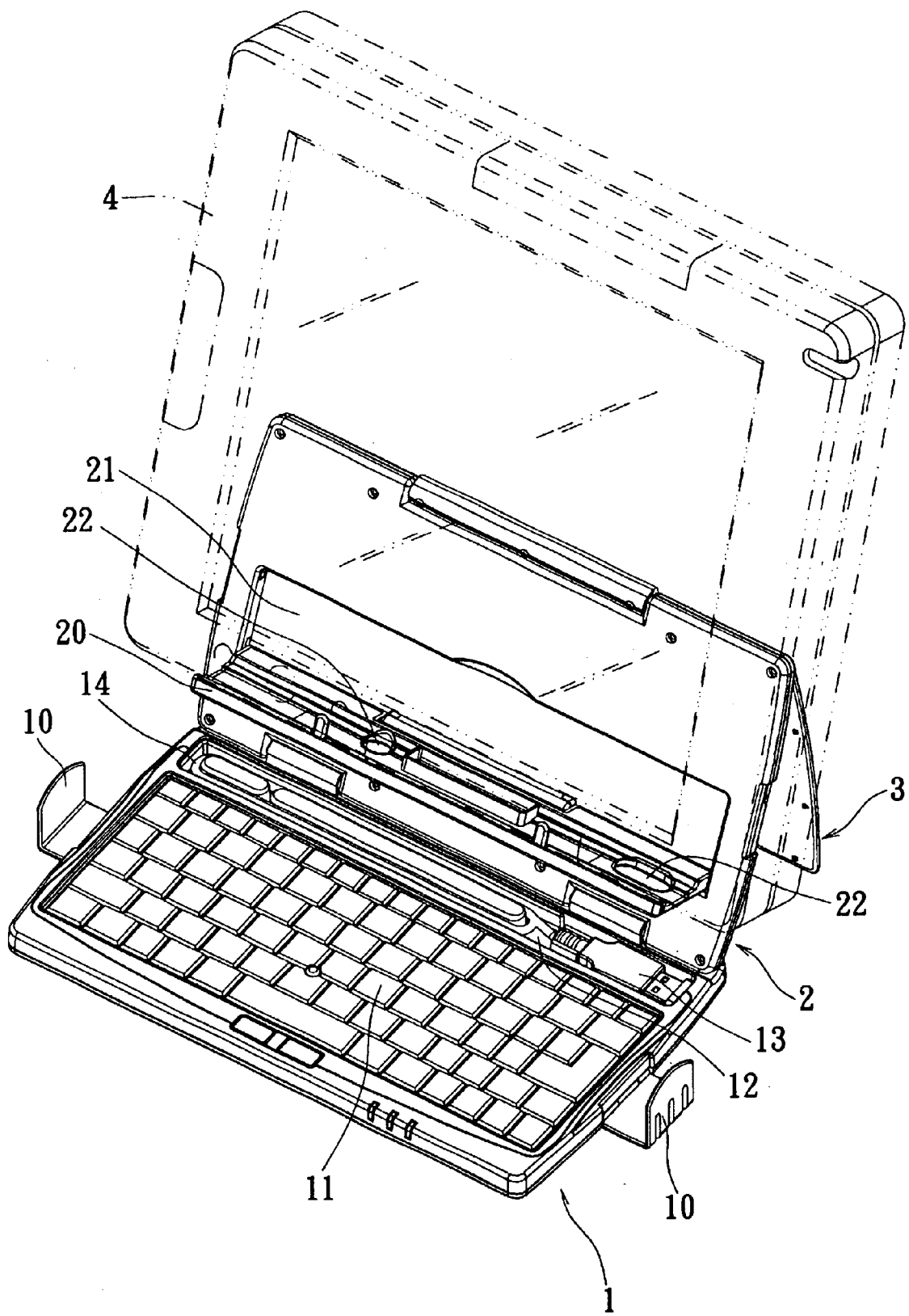
FIG. 3 is a schematic drawing showing an application example of the present invention.
Figure 4:
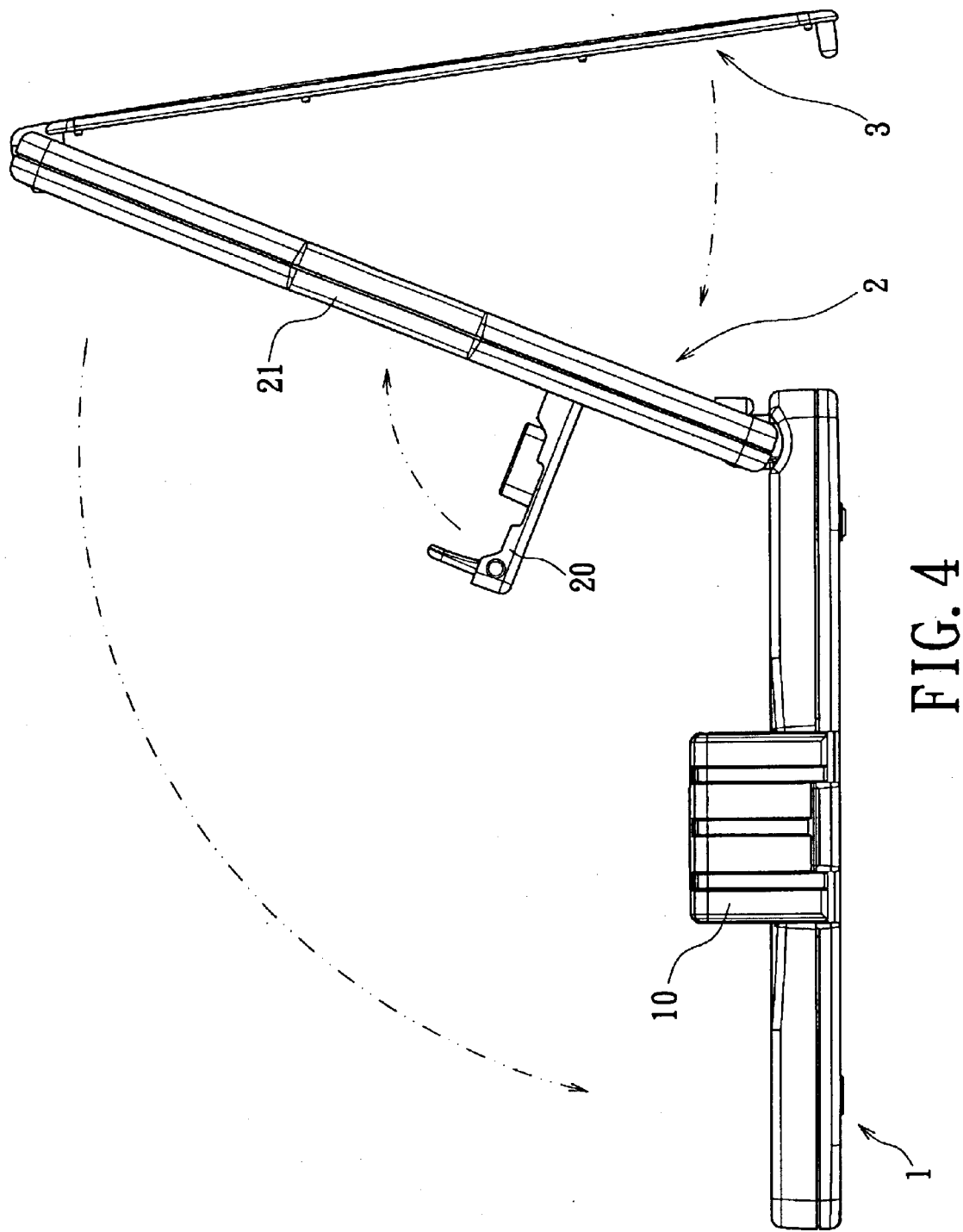
FIG. 4 is a schematic drawing showing the receiving action of the preferred embodiment of the present invention.
Figure 5:
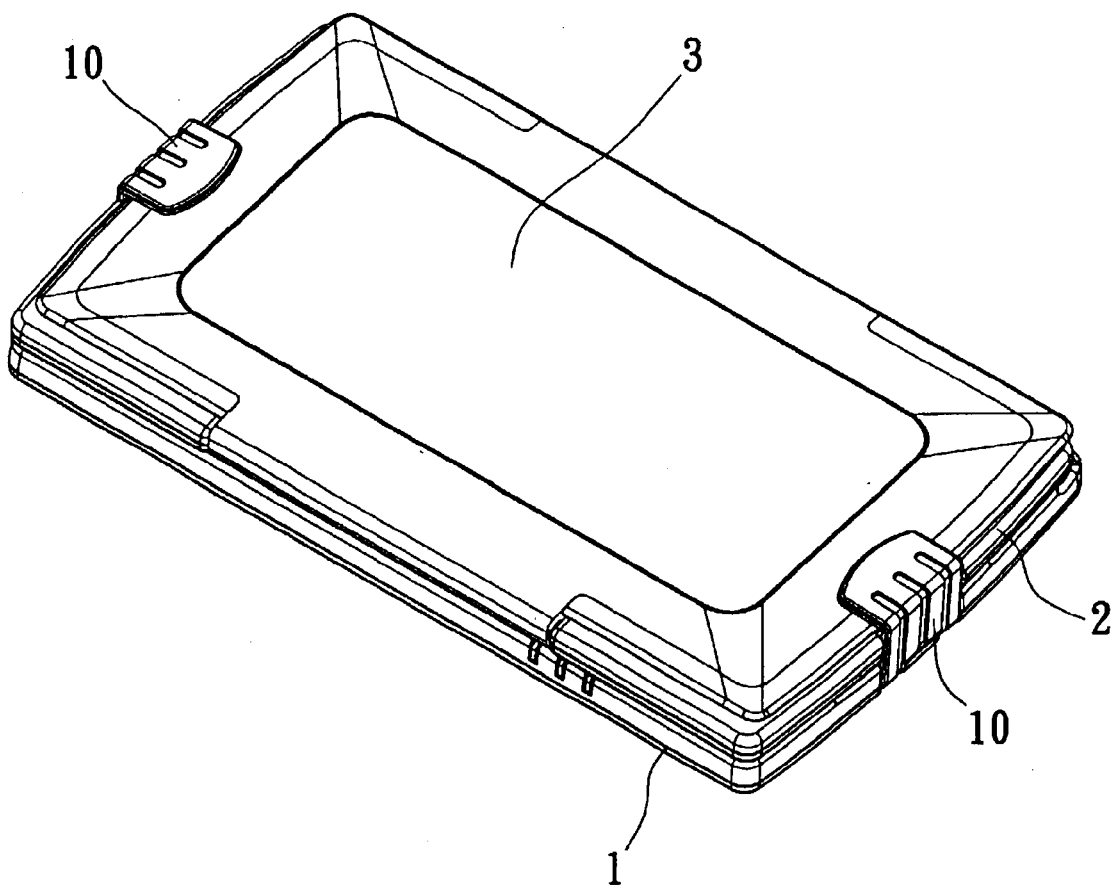
FIG. 5 is perspective view showing the preferred embodiment of the present invention received.

Referring to FIGS. 2–5, an information apparatus support structure in accordance with the present invention is shown comprised of a base 1, a first support frame 2, and a second support frame 3.

Referring to FIGS. 2 and 3 again, the base 1 is a flat device having two angled clamping plates 10 pivoted to the bottom wall thereof at two sides, an input device 11 carried in the top side thereof, an elongated recess 12 extended along one side and adapted to receive the USB (universal serial bus) connector 13 and cable 14 of the input device 11 or other accessories such as writing apparatus or small wireless transmission devices (not shown). The input device 11 can be a keyboard, hand-writing panel, or plotting board.

The first support frame 2 is pivoted to one side of the base 1 adjacent to the elongated recess 12, having a recessed receiving space 21 in one side, namely, the inner side, and a foldaway stand 20 pivoted to the inner side and moved in and out of the recessed receiving space 21. The foldaway stand 20 has a plurality of through holes 22 for the passing of the electric plugs of the power cable, printer cable, and/or other peripheral device cables of the information apparatus 4 supported on the foldaway stand 20 (see FIG. 3).

The second support frame 3 is a plate member pivoted to one side of the first support frame 2 remote from the base 1.

The base 1, the first support frame 2 and the second support frame 3 are fastened pivotally with one another by pivot friction so that they can be turned relative to one another and then set in position by means of friction resistance. When in use, the first support frame 2 is turned outwards from the base 1 to the desired angle, and then the second support frame 3 is turned outwards from the first support frame 2 to the desired angle to support the first support frame 2 in a tilted position, and then the foldaway stand 20 is turned out of the recessed receiving space 21, and then the information apparatus 4, for example, a tablet PC (personal computer) or PDA (personal digital assistant) is placed on the foldaway stand 20 and rested on the first support frame 2, enabling the USB cable of the information apparatus 4 to be inserted through one through hole 22 of the foldaway stand 20 and connected to the electric connector 13 of the input device 11.

Referring to FIGS. 4 and 5 again, when not in use, the foldaway stand 20 is turned upwards and set in the recessed receiving space 21, and then the second support frame 3 is turned inwards and closely attached to the first support frame 2, and then the first support frame 2 downwardly inwards and:closely attached to the base 1, and then the clamping plates 10 are respectively turned inwards and clamped on the second support frame 3 to hold down the second support frame 3 and the first support frame 2 on the base 1 in a stack.

A prototype of information apparatus support structure has been constructed with the features of the annexed drawings of FIGS. 2–5. The information apparatus support structure functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An information apparatus support structure comprising:

a base, said base comprising an input device, and two clamping plates respectively pivoted to two opposite lateral sides thereof;

a first support frame pivoted to said base and turnable relative to said base between a received position closely attached to said base and a tilted position above said base, said first support frame comprising a recessed receiving space in an inner side thereof facing said base and a foldaway stand pivoted to said inner side and turned in and out of said recessed receiving space and adapted to supporting an information apparatus on said first support frame and said first support frame turned outward from said base to said tilted position; and a second support frame pivoted to one side of said first support frame remote from said base and turnable relative to said first support member between an operative position where said second support frame support said first support frame in said tilted position and a non-operative position where said second support frame is closely attached to an outer side of said first support frame for enabling said first support frame and said second support frame to be held down on said base by said clamping plates when said first support frame turned to said received position.

2. The information apparatus support structure as claimed in claim 1, wherein said input device is one of a keyboard, a hand-writing panel and a plotting board.

3. The information apparatus support structure as claimed in claim 1, wherein said base has an elongated recess extended along one side adjacent to said first support frame and adapted to receive a USB (universal serial bus) cable of said input device and user's personal small items.

4. The information apparatus support structure as claimed in claim 1, wherein said foldaway stand has a plurality of through holes for the passing of cables of the information apparatus to be supported on said foldaway stand.

5. The information apparatus support structure as claimed in claim 1, wherein said base, said first support frame and said second support frame are pivoted to one another by pivot friction.

* * * * *